United States Patent
Lewis

(10) Patent No.: US 8,850,577 B2
(45) Date of Patent: *Sep. 30, 2014

(54) METHOD AND APPARATUS FOR PREVENTING AN IDT-BASED SECURITY SANDBOX FROM CAUSING A KERNEL PANIC WHEN USING A CALL GATE

(75) Inventor: Paton John Lewis, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 150 days.

This patent is subject to a terminal disclaimer.

(21) Appl. No.: 13/556,298

(22) Filed: Jul. 24, 2012

(65) Prior Publication Data
US 2014/0033304 A1 Jan. 30, 2014

(51) Int. Cl.
*G06F 21/00* (2013.01)
(52) U.S. Cl.
USPC ........ 726/22; 726/1; 726/23; 726/24; 726/25; 713/164; 718/100
(58) Field of Classification Search
CPC ..... G06F 12/1491; G06F 21/00; G06F 21/57; G06F 21/554; G06F 21/53
USPC ......... 726/17, 22–25, 1–4; 718/100; 713/152, 713/164–167
See application file for complete search history.

(56) References Cited

U.S. PATENT DOCUMENTS

| | | | |
|---|---|---|---|
| 8,468,600 B1* | 6/2013 | Kaskel et al. | 726/22 |
| 2004/0133802 A1* | 7/2004 | Liu | 713/200 |
| 2006/0047959 A1* | 3/2006 | Morais | 713/166 |
| 2007/0016914 A1* | 1/2007 | Yeap | 719/328 |
| 2008/0127292 A1* | 5/2008 | Cooper et al. | 726/1 |
| 2011/0197256 A1* | 8/2011 | Sharkey et al. | 726/1 |
| 2013/0013869 A1* | 1/2013 | Berezecki | 711/151 |
| 2013/0024930 A1* | 1/2013 | Steil et al. | 726/16 |
| 2013/0091568 A1* | 4/2013 | Sharif et al. | 726/22 |
| 2013/0283368 A1* | 10/2013 | Waddington et al. | 726/17 |

OTHER PUBLICATIONS

Tal garfinkel, Traps and Pitfalls: Practical Problems in System Call Interposition Based Security Tools, In Proceedings of the ISOC Symposium on Network and Distributed System Security, 2003.*
Bennet Yee et al, Native Client: A sandbox for Portable, Untrusted x86 Native Code, IEEE, 2009.*
Monirul Sharif et al, Secure In-VM Monitoring Using Hardware Virtualization, ACM, 2009.*

* cited by examiner

*Primary Examiner* — David Garcia Cervetti
*Assistant Examiner* — Shanto M Abedin
(74) *Attorney, Agent, or Firm* — Moser Taboada

(57) ABSTRACT

A method and apparatus for preventing an IDT-based security sandbox from causing a kernel panic when using a call gate is disclosed. The method comprises receiving a request from an application to create a secure sandbox, wherein epilog code is mapped into the application upon receiving the request; enabling a call gate, wherein the call gate defines a location of call gate target code for enabling the secure sandbox; executing the epilog code to facilitate an interrupt disable instruction; jumping through the call gate; and enabling the secure sandbox.

20 Claims, 4 Drawing Sheets

METHOD AND APPARATUS FOR PREVENTING AN IDT-BASED SECURITY SANDBOX FROM CAUSING A KERNEL PANIC WHEN USING A CALL GATE

BACKGROUND OF THE INVENTION

1. Field of the Invention

Embodiments of the present invention generally relate to secure sandboxes and, more particularly, to a method and apparatus for preventing an interrupt descriptor tables (IDT)-based security sandbox from causing a kernel panic when using a call gate.

2. Description of the Related Art

Secure execution of software applications is important in all computer systems. For example, errors in an application's code, in third party libraries and in an operating system, hereinafter referred to as "bugs", can expose the application to a security attack. One or more applications executing on a computing system may need to securely execute identified untested or untrusted code. Thus, executing a thread (that is, a scheduled amount of processing by an operating system), to occur in a secure sandbox provided by a host (generally referred to as "sandboxing"), is one way to try to prevent untrusted code from performing malicious activities on the host. Sandboxing allows a thread to execute in a secure environment included in a computing system. For example, a computing system can enable and use a secure sandbox to execute the identified untested or untrusted code. The computing system executes the identified code separately from other code in order to prevent the identified code from performing unwanted or, in some cases, malicious tasks in the computing system. A client application running on a host computing system selectively sets up the secure sandbox and uses it to execute the identified code. The secure sandbox monitors the execution of the thread while providing a controlled set of resources for use by the thread. For example, a sandbox allows a client application to securely execute a thread that is running code downloaded from the Internet or third party libraries. In addition, an application that accesses and uses untrusted data can be potentially open to security attacks. The use of a sandbox isolates and prevents the security attacks from affecting a host computer system.

A processor uses an interrupt descriptor table (IDT) to decide what to do when an interrupt occurs. In situations where more than one IDT has been created, an IDT register (IDTR) is included in a host computing system to point to the current IDT, such as a standard or default IDT. Moreover, a device driver, including an application program interface (API) may modify the IDTR to instead point to another IDT, such as a custom IDT. The use of a custom IDT allows untrusted code to operate in a secure sandbox without having access to the operating system kernel. An IDT-based secure sandbox is created with the aid of the device driver. The device driver maps code (called the "epilog") into the memory map of the thread to be sandboxed. The sandbox is then enabled by substituting a different IDT when the sandboxed thread is executing. This allows all interrupts to be intercepted by the device driver. Other kernel entry instructions, for example system call instructions ("syscall") and system enter instructions ("sysenter"), may similarly be intercepted by the device driver. The stack is a data structure in memory. When an interrupt fires during execution of an application, the address in the application code where execution was interrupted is stored in the stack. When programming control needs to be transitioned to the kernel (for example, when processing a timer interrupt or a syscall/sysenter), the original IDT is restored, a return address on a stack is saved and replaced with the address of the epilog. Control is then passed to a kernel interrupt handler. When the kernel finishes handling the interrupt, it looks to the stack to see to what address it is to return control. After the kernel resumes execution of the thread that was sandboxed, the epilog code executes and calls the driver to re-enable the sandbox, which then replaces the return address in the stack so that programming control will resume at the point where the original interrupt (or syscall/sysenter) occurred. The IDT-based sandbox is enabled using a call gate to transition to driver-controlled code without going through the operating system kernel. However, when the call gate is used to transition to driver-controlled code, referred to as "jumping through the call gate", the stack is switched from a low privilege stack to a high privilege stack. When an interrupt (or syscall/sysenter) occurs while the sandbox is enabled, the driver may decide to ignore or handle the interrupt itself, or possibly transfer control to the kernel to handle the interrupt (or syscall/sysenter).

An application is not able to disable interrupts before calling the call gate without the CPU privilege level being elevated to grant permission to the application. After jumping through the call gate, the thread will begin using a higher privilege stack (e.g., the ring 0 stack on an INTEL® x86 platform). However, for example, a timer event might fire causing a timer interrupt to be triggered after a jump through the call gate but before interrupts are disabled. In that case, the kernel would start executing the timer interrupt handler using the same high level privilege stack. If the timer interrupt handler makes assumptions about the contents of the stack, specifically, if the kernel assumes the stack was empty prior to the interrupt, that could cause a panic (an action taken by an operating system upon detecting an internal fatal error), which could cause the kernel to shut down. Alternatively, if the timer interrupt does not make assumptions about what is on the stack, but the handler happens to use what would normally be all of the available stack space, because additional values have been added onto the stack, it could end up overflowing the stack. Accordingly, because the high privilege level stack (ring 0 stack on an INTEL® x86 platform) is being used when jumping the call gate, if interrupts are not disabled to keep them from being handled by the kernel, there could be conflicts between how the kernel handles that interim stack and the way the application handles the interim stack.

Therefore, there is a need for a method and apparatus for preventing an IDT-based security sandbox from causing a kernel panic when using a call gate.

SUMMARY OF THE INVENTION

Embodiments of the present invention provide a method and apparatus for preventing an IDT-based security sandbox from causing a kernel panic when using a call gate comprising receiving a request from an application to create a secure sandbox, wherein epilog code is mapped into the application upon receiving the request. A call gate is enabled that defines a location of call gate target code for enabling the secure sandbox. The method executes an interrupt disable instruction before it jumps through the call gate and enables the secure sandbox.

Figure 1:
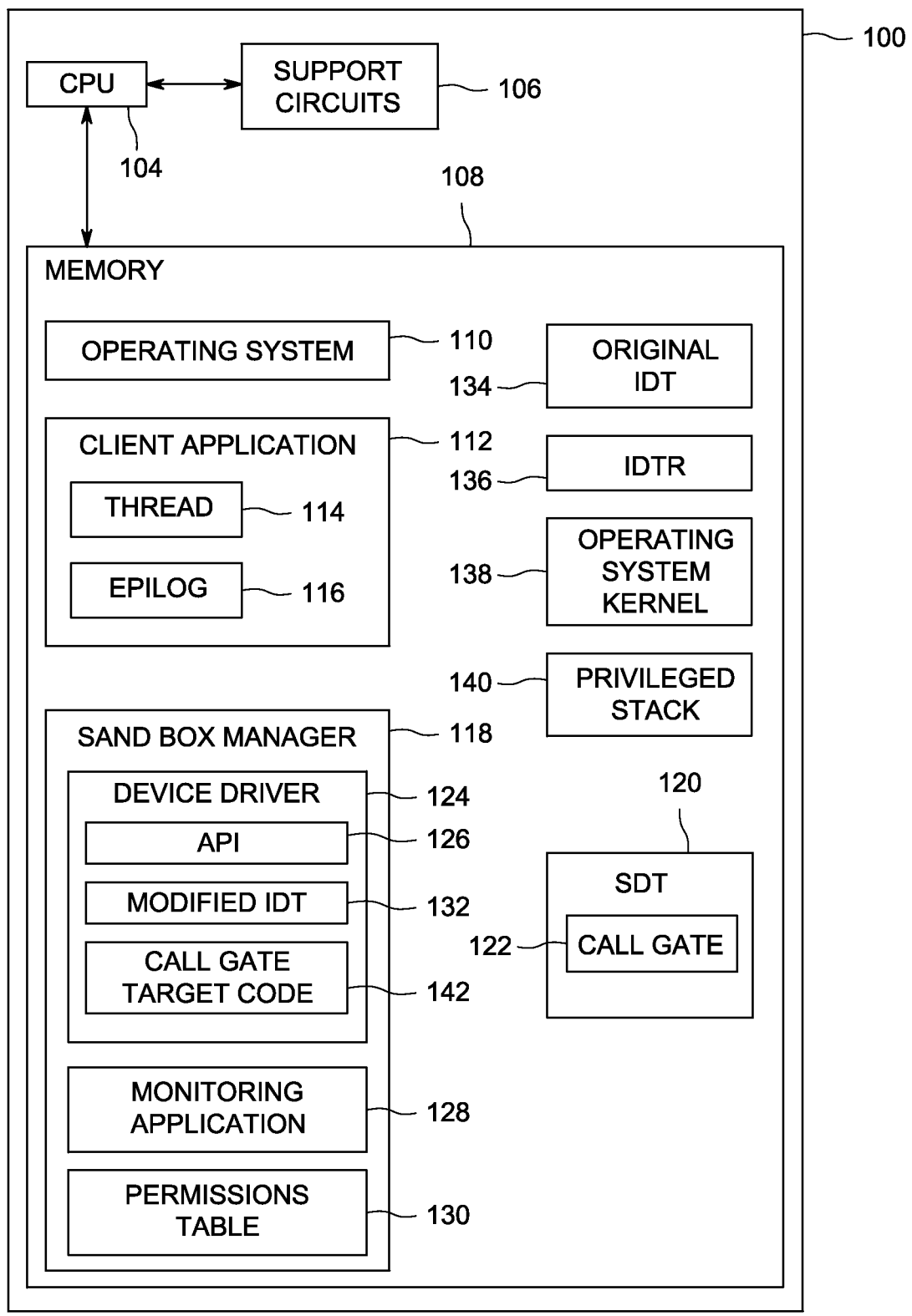
FIG. 1 depicts a block diagram of a computer for preventing an IDT-based security sandbox from causing a kernel panic when using a call gate, according to one or more embodiments of the invention.

While the method and apparatus is described herein by way of example for several embodiments and illustrative drawings, those skilled in the art will recognize that the method and apparatus for preventing an IDT-based security sandbox from causing a kernel panic when using a call gate are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for preventing an IDT-based security sandbox from causing a kernel panic when using a call gate as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. In addition, although exemplary embodiments are described with respect to an INTEL® x86 platform, it should be understood, that the present invention is not limited to the INTEL® x86 platform. Rather, the invention applies to all architectures.

DETAILED DESCRIPTION OF EMBODIMENTS

Embodiments of the present invention comprise a system for preventing an IDT-based security sandbox from causing a kernel panic when using a call gate. Embodiments of the invention provide a device driver, which provides an application program interface (API) that a client application calls to implement a secure sandbox. A secure sandbox allows a client application to run one or more threads of execution in a secure environment included in a computing system. The sandbox provides a secure computing environment (e.g., memory and resources separate from the main operating environment) for execution of the identified thread. The secure environment provided by the sandbox executes a thread in an environment that is isolated from the operating system kernel as well as additional operating system specific registers. The isolation prevents the thread from executing malicious code that could cause damage to the operating system kernel and the host computing environment because the thread cannot have direct access to the operating system kernel functions.

The client task makes a standard API call to the device driver (for example, mmap), that maps epilog code into the client task and adds a call gate descriptor to the local descriptor table (LDT). The client task makes a second API call (for example, ioctl) to the device driver which modifies the return address in the stack frame for the API call to point to the epilog code, saves the original return address in a driver-controlled table, and modifies the flags for the client task in the stack frame. Modifying the flags changes the I/O Privilege Level (IOPL) from a high privilege level (for example, ring 0 on an INTEL® x86 platform) to a low privilege level (for example, ring 3 on an INTEL® x86 platform). Because the return address in the stack frame for the API was modified to point to the epilog code, when the ioctl function returns, the epilog code begins executing. When the epilog code executes, IOPL is set to 3, which allows the lower privileged level client application, in which the epilog code is now mapped, to execute the privileged 'cli' instruction to disable interrupts. The epilog code then calls 'cli' to disable interrupts and jumps through the call gate. Jumping through the call gate refers to switching from a first segment of code to a second segment of code, the second segment of code referred to as the "call gate target code" while also elevating privileges (e.g., from ring 3 to ring 0 on the INTEL® 64 architecture). Upon execution, the call gate target code enables the sandbox. The call gate target code also modifies the return address in the stack frame to return programming control to the address saved in the table by ioctl, and then modifies the client task flags in the stack frame so that upon return, the client code will execute with interrupts enabled and IOPL set to zero. Finally, the call gate target code disables the call gate. Therefore, after the client calls ioctl, the sandbox is enabled, IOPL is still set to zero so that the privileged instruction such as 'cli' cannot be called, and the call gate is disabled.

When an interrupt fires while the sandbox is enabled, and the interrupt must be passed onto the underlying kernel, the driver's interrupt handler will perform the same operations as the driver did in response to ioctl. Specifically, a table stores the original interrupted address, the IOPL is set to 3 in the flags stored in the interrupt frame, the call gate descriptor is enabled, and the interrupt frame return address is modified to point to the epilog. Programming control is then transferred to the kernel's interrupt handler for that interrupt. Upon return from the kernel's handler, the driver re-enables the sandbox, resets IOPL to a high privilege level (e.g., ring 0 on an INTEL® x86 platform), re-enables interrupts and returns programming control to the sandboxed thread.

Various embodiments of an apparatus and method for preventing an IDT-based security sandbox from causing a kernel panic when using a call gate are described. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of a computer system 100 for preventing an IDT-based security sandbox from causing a kernel panic when using a call gate, according to one or more embodiments of the invention. Exemplary embodiments of the computer system 100 may include desktop computers, laptops, tablet computer, smart phones, personal digital assistants (PDAs), cellular phones, and the like.

The computer system 100 comprises a CPU 104, support circuits 106, and a memory 108. The CPU 104 may comprise one or more commercially available microprocessors or microcontrollers that facilitate data processing and storage. The various support circuits 106 facilitate the operation of the CPU 104 and include one or more clock circuits, power supplies, cache, input/output circuits, displays, and the like. The memory 108 comprises at least one of Read Only Memory (ROM), Random Access Memory (RAM), disk drive storage, optical storage, removable storage and/or the like. The memory 108 comprises an operating system 110, a client application 112, a sandbox manager 118, an original interrupts descriptor table 134, an interrupts descriptor table register (IDTR) 136, an operating system kernel 138, a privileged stack 140, and an SDT 120. The client application 112 comprises a thread 114 that is to be run in a sandbox, and an epilog 116, which is code that is mapped into the client application 112 to control access by the client application 112 to the device driver 124. The sandbox manager 118 comprises a device driver 124, a monitoring application 128, and a permissions table 130. The SDT 120 comprises a call gate 122. The device driver 124 comprises an application programming interface (API) 126, a modified IDT 132, and call gate target code 142.

According to some embodiments of the invention, the operating system (OS) 110 manages various computer resources (e.g., network resources, file processors, and/or the like). The operating system 110 is configured to execute operations on one or more hardware and/or software modules, such as Network Interface Cards (NICs), hard disks, virtualization layers, firewalls and/or the like. The operating system 110 manages interrupts. Interrupts provide an efficient way for the operating system 110 to interact with and react to its environment. Interrupts provide the computer system 100 with a way of automatically saving local register contexts and running specific code in response to events, the code being found by address lookup in the IDT 134. When an interrupt is received, the operating system kernel 138 automatically suspends the client application 112 that is currently running, and runs computer code associated with the interrupt, which is found by looking up the code address associated with that interrupt in the original IDT 134.

When a hardware device triggers an interrupt, the operating system's kernel decides how to deal with this event, generally by accessing the original IDT 134. The client application 112 may also trigger an interrupt to the operating system. If the client application 112 wishes to access hardware for example, it may invoke a software interrupt, which causes programming control to be passed back to the kernel. The kernel will then process the request. If the client application 112 seeks additional resources (or wishes to shed resources) such as memory, the client application 112 will trigger an interrupt to get the attention of the operating system kernel 138. Examples of the operating system 110 may include, but are not limited to, Android, iOS, Linux, Mac OSX, BSD, UNIX, Microsoft Windows, and the like.

The sandbox manager 118 enforces secure sandbox constraints on a client thread 114. For example, the computer system 100 can be referred to as a host. Such a secure sandbox prevents the execution of a thread 114 in a host computer system 100 from transferring programming control directly to the host's operating system kernel 138. As a consequence, the sandboxed thread 114 cannot exploit operating system or host application bugs. As another example, the secure sandbox reduces the privileges under which the sandboxed thread 114 executes as compared to the privileges the thread 114 would have if executed outside of the sandbox.

In some embodiments, a client application 112 generates an instance of the thread 114. The client application 112 determines that the thread 114 should execute in a secure environment based on the functions called for in the thread 114. For example, if the client application 112 determines that the functions called for in the thread 114 are from an unidentified third party (e.g., code downloaded from the Internet) there is the potential that the functions could perform malicious operations in the computer system 100.

The computer system 100 typically executes one or more client applications 112. The client application 112 includes trusted code that can be executed by the computer system 100. The client application 112 accesses code from a variety of additional sources (e.g., the Internet, third party libraries) both known and unknown to the computer system 100. For example, the client application 112 may open a binary plug-in (not shown) for execution by a user. The file may originate from a source unknown to the client application 112 (e.g., a web site). If the client application 112 does not have knowledge of the content of the file or its origin, the client application 112 may determine that the executable code in the file be run in a thread 114 in a secure sandbox. In another example, a client application may use a third party library (not shown) to; for example, print the contents of a file. Since the library is from an outside source, the client application 112 is unaware of its contents and may decide to run a thread 114 for the code to print the file via the secure sandbox.

As noted above, the client application 112 may generate one or more threads 114. For example, each thread 114 is an instance generated from the execution of at least one task or operation for the client application 112. The client application 112 is configured so that one or more instructions or function calls in the thread 114 should be executed in a secure environment. The client application 112 therefore initiates execution of the thread 114 in the secure sandbox.

To do so, the client application 112 calls a standard application program interface (API) 126 provided by the device driver 124 via the standard way of calling device driver APIs on the operating system that is being used (e.g., MICROSOFT® Windows or Apple's OS/X). The API 126 maps the epilog 116 into the client task. The API 126 may also map memory referred to as the "call gate target code" into the virtual memory maps for both the client application and the kernel at the same virtual address. The API 126 adds a call gate descriptor 112 to the segment descriptor table (SDT) 120 for the client application. In some embodiments, the call gate descriptor specifies the address in the virtual memory map as the target address for the call gate. In some embodiments, the client application 112 then uses the call gate 122 included in the segment descriptor table (SDT) 120 included in memory 108 in the computer system 100. For example, the SDT 120 is a local descriptor table. In another embodiment, the SDT 120 is a global descriptor table. The call gate 122 is specified by a call gate descriptor in the SDT 120.

The client application 112 makes a second standard API call, namely input/output control (ioctl) to the device driver 124. The device driver 124 modifies the return address in the privileged stack 140 for the API call to point to the epilog 116. The device driver 124 saves the original return address in a driver-controlled table in memory 108, and modifies the flags for the client task in the stack frame to change the input/output privilege level (IOPL) from a high privilege level (e.g., ring 0 on an INTEL® x86 platform) to a low privilege level (e.g., ring 3 on an INTEL® x86 platform). When the ioctl function returns, the epilog 116 begins execution with IOPL set to 3 (e.g., low privilege level), which allows low privilege level code (e.g., ring 3 code on an INTEL® x86 platform) to execute the privileged 'cli' instruction, which disables interrupts. The epilog 116 then calls 'cli' to disable interrupts before it jumps through the call gate 122.

In response to jumping through the call gate 112, the call gate target code 142 is executed. The thread 114 executes with interrupts disabled and there is no risk of conflict between the privileged stack 140 and the kernel interrupt handlers and therefore, no risk of a kernel panic. The call gate target code 142 enables the sandbox. The sandbox is implemented using redirection based on an IDT. The device driver 124 modifies an IDT register (IDTR) 136 to include a base address for a modified IDT 132. The IDTR 136 includes the base address for the modified IDT 132 and the length (e.g., in bytes) for the modified IDT 132. The device driver 124 stores the original value of the IDTR 136, for example, in memory 108 included in the computer system 100 prior to modifying the value of the IDTR 136. The original value of the IDTR 136 is the value of the IDTR 136 set by the operating system 110 when the computer system 100, is initialized (e.g., at system boot). The modified IDT 132 includes an array of descriptors, where each descriptor points to a memory location that includes code controlled by the device driver 124 to execute in response to the receiving of specific interrupts identified by the device driver 124.

The call gate target code 142 then modifies the return address in the privileged stack 140 to return programming control to the thread 114 at the point where the call into the device driver 124 occurred to the address specified in driver-controlled table in memory 108 (e.g., the address in the thread 114 at the point where the ioctl call into the device driver occurred). The call gate target code 142 modifies the client task flags in the stack frame so that upon return, the client code will execute with interrupts enabled and the IOPL set to high privilege level (e.g., ring 0 in INTEL® x86 platform). Finally, the call gate target code 142 disables the call gate 122 by disabling or removing the call gate descriptor from the SDT 120. Therefore, once the sandbox is enabled, the client application 112 has no elevated privileges and it cannot see the call gate 122.

Figure 2:
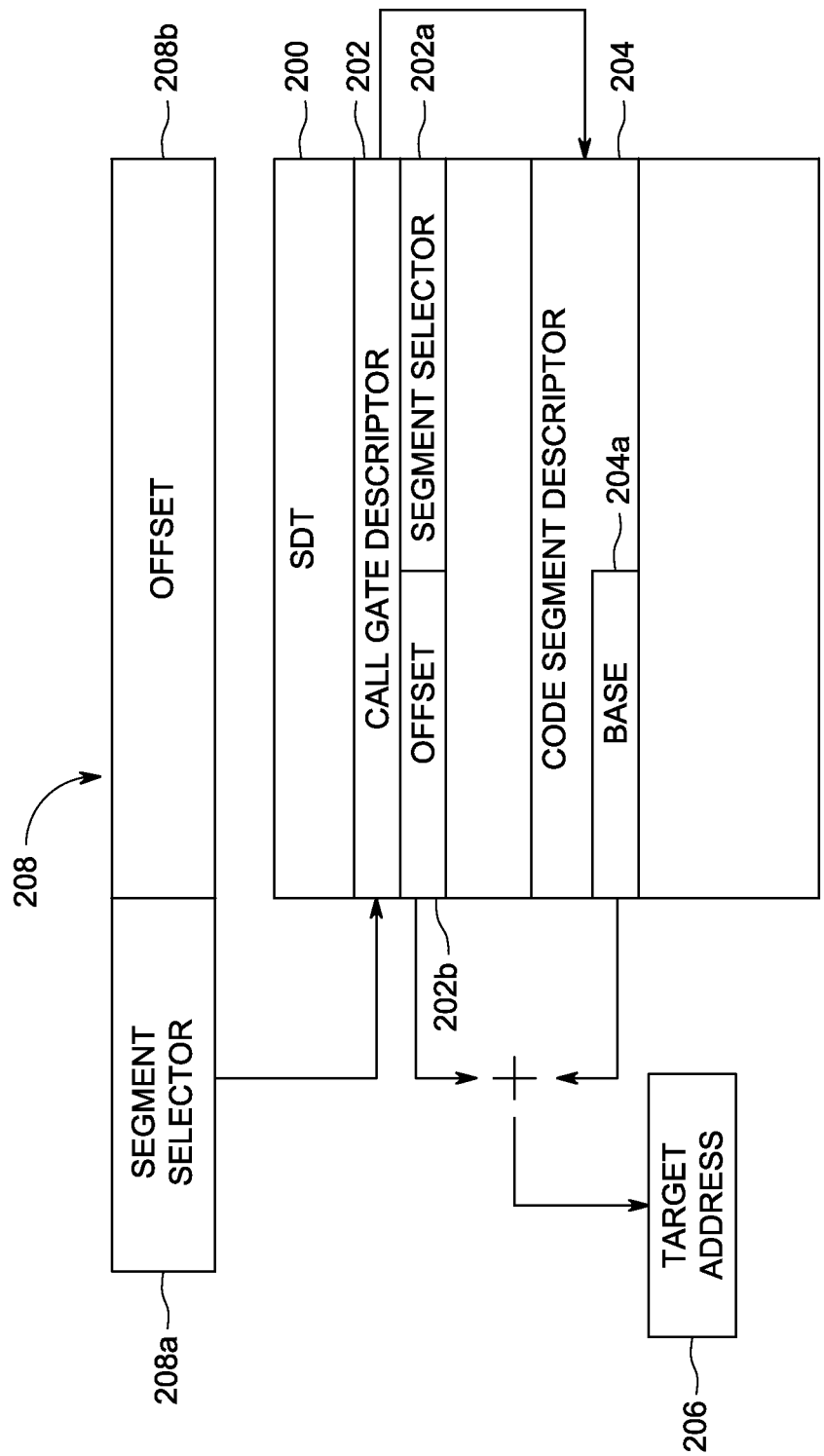
FIG. 2 depicts a block diagram illustrating an example of a segment descriptor table (SDT) of FIG. 1 and how the call gate target address is computed for the call gate selector, according to one or more embodiments of the invention.

FIG. 2 depicts a block diagram illustrating an example of a segment descriptor table SDT 120 in FIG. 1 and how the call gate target address is computed for the call gate selector, according to one or more embodiments of the invention. For example, each process executed by an operating system kernel 138 may have a segment descriptor table 200. The SDT 200 includes segment descriptors. Here, a call gate descriptor 202 and a code segment descriptor 204 are shown. The operating system 110 may switch the current SDT when scheduling a new process to an SDT for the new process.

The call gate 122 is a mechanism that allows the computer system 100 to transition from one code segment to another. The call gate 122 specifies the destination of the transition (code segment to access). In addition, the call gate 122 defines an entry point for a procedure included in a specified code segment. For example, the INTEL® x86 architecture provides a segment descriptor table and a call gate.

The call gate descriptor 202 includes a compound destination address that includes a segment selector 202*a* and an offset 202*b*. The segment selector 202*a* is an index to the code segment descriptor 204 included in the SDT 200. The call gate descriptor 202 specifies the required privilege level for a caller trying to access the procedure. The offset 202*b* is used along with a base 204*a* to calculate a target address 206. The target address 206 is the address in memory of the location of the call gate target code entry point. The code segment descriptor 204 also determines the privilege level that the thread will have when it begins executing the call gate target code.

An application makes a far call to the address included in a far pointer 208 in order to access the call gate descriptor 202. The far call uses the far pointer 208 that includes a segment selector 208*a* and an offset 208*b*. The segment selector 208*a* is an index to the call gate descriptor 202 in SDT 200. For example, when implemented by the INTEL® x86 architecture, the offset is required but not used by the computing system.

Referring to FIGS. 1 and 2, the client application 112 calls the API 126 provided by the device driver 124. The client application 112 calls the device driver API 126 when initially entering the device driver 124. The API 126 maps a portion of the memory 108 included in the computer system 100 into a virtual memory map for use by the client application 112 and possibly also the operating system kernel 138. In some embodiments, the mapped virtual memory is at the same virtual memory address accessed by both the client application 112 and the operating system kernel 138.

The client application 112 may have a segment descriptor table (SDT) 200 associated with it. The API 126 adds a call gate descriptor (e.g., call gate 122 represented by call gate descriptor 202) to the SDT 200. The call gate descriptor 202 is a compound destination address that includes the segment selector 202*a* and the offset 202*b*. In addition, the call gate descriptor 202 specifies the allowable privilege level for the caller (the caller application 112) as a low privilege level (e.g., ring 3 on an INTEL® x86 platform). The segment selector 202*a* specifies that the caller (the client application 112) will transition to a higher privilege level (e.g., ring 0 on an INTEL® x86 platform) in order to be able to execute the call gate target code. The call gate descriptor 202 points to a target code segment used by the call gate target code that has a higher privilege level (e.g., ring 0 on an INTEL® x86 platform) than the client application 112 and zero for the address base and the maximum value for the address limit. The call gate descriptor 202 along with the code segment descriptor 204 provides the target address 206 for the call gate 122 as the virtual memory address established by the device driver API 126 for both the client application 112 and possibly also the operating system kernel 138.

When the client application 112 chooses to sandbox a thread of execution (e.g., thread 114), the client application 112 will request the sandboxing using the call gate 122. Before the client application 112 requests to sandbox the thread, the device driver API 126 changes the IOPL from the higher privilege level (e.g., ring 0 on an INTEL® x86 platform) to the lower privilege level (e.g., ring 3 on an INTEL® x86 platform). This allows interrupts to be disabled before the client application jumps through the call gate 122. The client application 112 makes a far call to the call gate 122 using the epilog code, which uses the segment selector 208a. For example, when the call gate 122 is implemented on an INTEL® x86 platform, the epilog code sets the offset 208b equal to zero as the offset 208b is not used when accessing a call gate descriptor (e.g., call gate descriptor 202) included in a segment descriptor table 200. The call gate 122 accesses the device driver 124 to enable the IDT-based sandbox in the manner previously described. The use of the call gate 122 to directly access the device driver 124, eliminates the use of the operating system kernel 138 to enable the secure sandbox for the requested task (e.g., thread 114). The call gate descriptor 202 along with the code segment descriptor 204 determines the target address 206 for the call gate 122 as the virtual memory address established by the device driver API 103. The device driver 124 then executes the call gate target code 142 to enable the secure sandbox for the thread 114. Once the sandbox is enabled, the call gate target code modifies the client task flags in the stack frame to set the IOPL to the higher privilege level (e.g., ring 0 on an INTEL® x86 platform), and to re-enable interrupts before returning programming control directly to the client application 112.

The following are examples illustrating operations that may be performed when the secure sandbox managed by the sandbox manager 118 has been established. While monitoring the execution of the thread 114 in the secure sandbox, the device driver 124 identifies and traps a call into the operating system 110. A call into the operating system 110 may include an interrupt instruction (an interrupt) or an operating system instruction (e.g., sysenter or syscall). In some embodiments, the device driver 124 determines, by accessing the permission table 130, that the trapped call is an interrupt whose value is included in the permission table 130. Interrupt values and system call values included in the permission table 130 are operating system calls whose service routines may be executed within the secure sandbox. In some embodiments, this is done by the device driver 124 passing the trapped call (e.g., the interrupt value) to a monitoring application 128. The monitoring application 128 determines, by accessing the permissions table 130, that the trapped call is an interrupt whose value is included in the permissions table 130. The monitoring application 128 then informs the device driver 124 to permit the trapped call (e.g., the interrupt).

In order for the thread 114 to execute the interrupt, the hardware saves the return address and the flag register on a privileged stack 140. The hardware uses the previously modified IDTR 136 to access the modified IDT 132 in order to run the associated replacement code, provided by the device driver 124 to perform the function for the trapped call. In a sense, the modified IDT 132 serves as a gateway between the thread 114 and the device driver 124. In some embodiments, the replacement code is compiled with and embedded in the device driver 124.

Once the execution of the replacement code is complete, the device driver 124 returns programming control to the thread 114 at the point where the call into the operating system 110 occurred. Thread execution proceeds with the device driver 124 continuing to monitor the execution of the thread 114.

In some embodiments, the device driver 124 determines that the trapped call is a fast call instruction (e.g., a syscall or a sysenter). As described, the thread 114 executes the fast call in the secure sandbox in a similar manner as an identified interrupt.

While continuing to monitor the execution of the thread 114, the device driver 124 identifies and traps another call into the operating system 110. In contrast to the examples above, the device driver 124 now determines that the trapped call is an interrupt whose value is included in the permissions table 130. Interrupt values included in the permissions table 130 are interrupts whose service routines are flagged for execution outside of the secure sandbox and can be executed by the operating system kernel 138. In some embodiments, this can be done by the device driver 124 passing the trapped call (e.g., the interrupt value) to a monitoring application 128. The monitoring application 128 determines, by accessing the permissions table 130, that the trapped call is an interrupt whose value is included in the permissions table 130. For example, the interrupt may be a timer interrupt or a page fault interrupt. The interrupt service routines for these interrupts include trusted operating system code for execution by the operating system kernel 138. The monitoring application 128 then informs the device driver 124 that the trapped call (e.g., the interrupt) can be passed directly to the operating system kernel 138.

In order for the thread 114 to execute the interrupt, the hardware saves its return address and flag register on a privileged stack 140. The device driver 124 restores the IDTR 136 to the original value supplied by the operating system 110. For example, the device driver 124 accesses the saved value of the IDTR from the memory 108 and places it into the IDTR 136. The replacement of the IDTR 136 with its original value effectively disables the secure sandbox. In addition, the device driver 124 modifies the privileged stack 140 by replacing or modifying the return address used by the hardware as the return address for the interrupt. The replaced or modified return address points to code (epilog 116) mapped into the client application 112 address space by the device driver 124 that requests the re-enabling of the secure sandbox using the call gate 122 provided by the device driver 124 once the interrupt service routine has been executed. The device driver resets IOPL to a low privilege level (e.g., ring 3 on an INTEL® x86 platform), and re-enables the call gate.

The device driver 124 then passes programming control to the operating system kernel 128. At this point, the thread 114 is no longer executing in the secure sandbox. In effect, the operating system 110 behaves as if the device driver 124 has not been loaded or implemented. The device driver 124 uses the original operating system provided IDT 134 in order to look up and jump to kernel-mode code to perform the function for the interrupt (e.g., execute the interrupt service routine). Once the execution of the kernel-mode code for the interrupt is complete, execution control for the thread 114 is returned to the code in the epilog 116, which is pointed to by the address stored on the privileged stack 140. The code included in the epilog 116 uses the call gate 122 to request the enabling of the secure sandbox (effectively re-enabling the secure sandbox) for continued execution of the thread 114. For example, the epilog code, when executed, jumps through the call gate 122 to execute the call gate target code 142 in order to re-enable the secure sandbox. The device driver 124 re-enables the sandbox, resets IOPL to a high privilege level (e.g., ring 0 on an INTEL® x86 platform), re-enables interrupts and then returns programming control to the thread 114 at the point where the now serviced interrupt occurred. The hardware retrieves previously stored status and flag registers from the privileged stack 140. Thread execution proceeds with the device driver 124 continuing to monitor the execution of the thread 114.

While continuing to monitor the execution of the thread 114, the device driver 124 in this example identifies and traps yet another call to the operating system. In this example, the device driver 124 determines, by accessing the permissions table 130, that the trapped call is an interrupt instruction or an operating system instruction that mandates the shutdown of the sandboxed thread 114. For example, an operating system instruction may involve access to operating system functions that the thread 114 is not permitted to access. In this example, the device driver 124 calls the operating system kernel 138 to terminate the thread 114. In another example, an interrupt may attempt to perform a read operation from an input device that could introduce malicious data into the client application 112. The device driver 124 requests the operating system kernel 138 shut down the thread 114 to prevent the input read operation.

Figure 3:
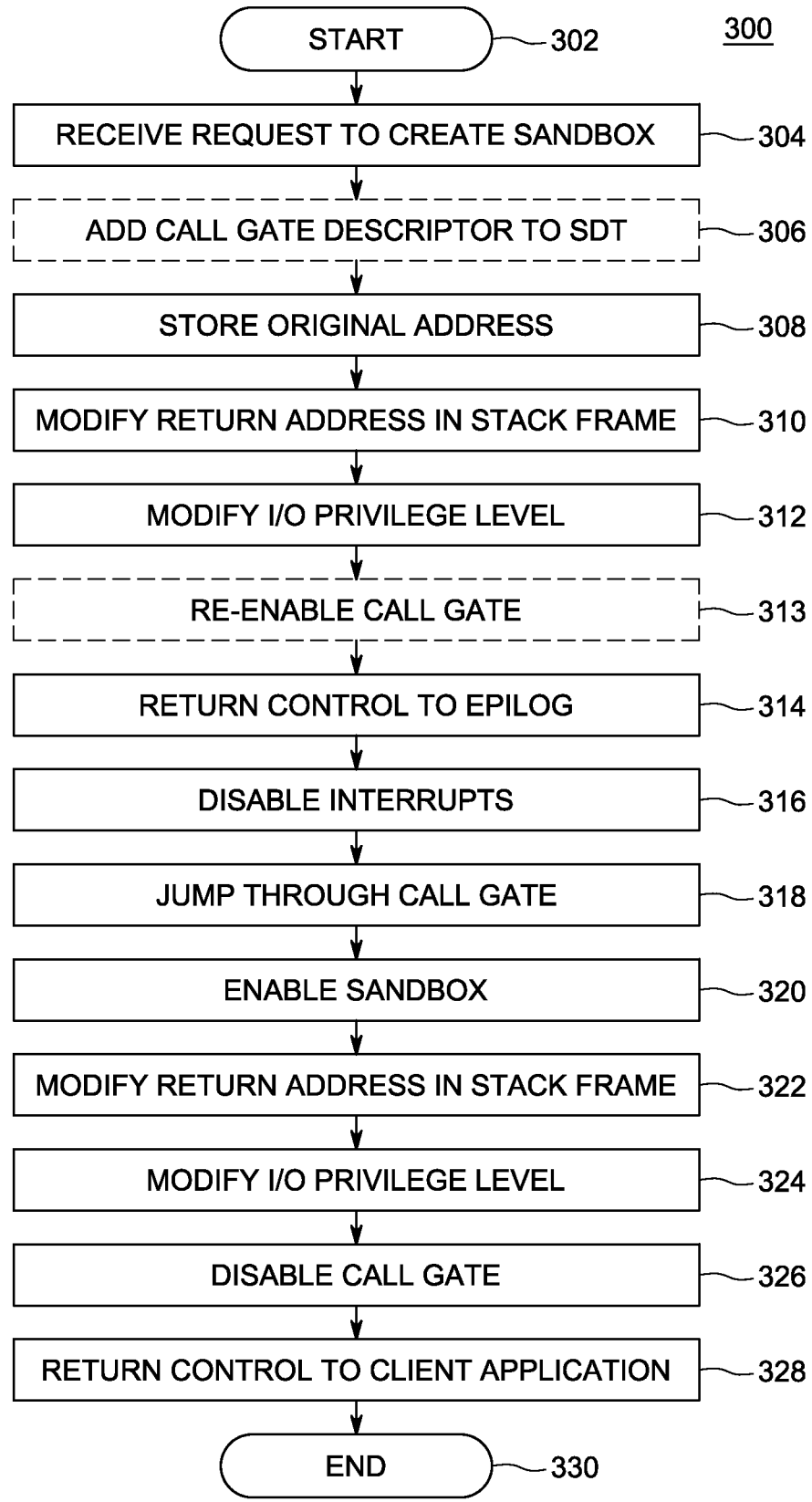
FIG. 3 depicts a flow diagram of a method for preventing an IDT-based security sandbox from causing a kernel panic when using a call gate as performed by the computer of FIG. 1, according to one or more embodiments of the invention.

FIG. 3 depicts a flow diagram of a method 300 for preventing an IDT-based security sandbox from causing a kernel panic when using a call gate as performed by the computer system 100 of FIG. 1, according to one or more embodiments of the invention. The method 300 is performed when an initial request is made to execute a thread in a secure sandbox. The method 300 is also performed after allowing the kernel to handle an interrupt after which the call gate and sandbox must be re-enabled.

The method 300 starts at step 302, and proceeds to step 304. At step 304, the method 300 receives a request to setup a sandbox. In response, the method 300 generates an instance of a thread to run in the sandbox. The method 300 calls an API provided by the device driver. The device driver maps epilog code into the client task's memory space. The epilog contains code that disables interrupts before the call gate is enabled. The method 300 proceeds to step 306.

At step 306, the method 300 adds the call gate descriptor to a segment descriptor table (SDT) as depicted in FIG. 2 above. This step is performed during the first iteration of the method 300 when creating the initial security sandbox. If the sandbox is being re-enabled after allowing the kernel to handle an interrupt, this step is skipped. The method 300 proceeds to step 308.

At step 308, the method 300 stores the original return address in a driver-controlled table. The method 300 proceeds to step 310.

At step 310, the method 300 modifies the stack frame. When the API call is made to the device driver, the address from where the API call was made is stored in the stack frame. The method 300 modifies the return address in the stack frame for the API call to point to the epilog code. Instead of returning to the address in the client code where the API call was made or where the interrupt occurred, programming control will be returned to the epilog code. The method 300 proceeds to step 312.

At step 312, the method 300 modifies flags in the stack frame. The flags for the client task in the stack frame are modified to change the I/O privilege level from a high privilege level (e.g., ring 0 on an INTEL® x86 platform) to a low privilege level (e.g., ring 3 on an INTEL® x86 platform). This allows low privilege code, such as the client application, to call the privileged 'cli' instruction, which disables interrupts. The method 300 proceeds to step 313.

At step 313, the call gate is enabled. This step is not performed during the first iteration of the method 300 when the initial security sandbox is created. This step is performed after a first iteration of the method 300. This step is performed after disabling the call gate as described in step 326 below. The method 300 proceeds to step 314.

At step 314, the method 300 returns programming control to the client epilog code. The epilog code begins executing with IOPL set to the lower privilege level (e.g., level 3 on an INTEL® x86 platform). This allows the client epilog code to execute some privileged instructions, including The method 300 proceeds to step 316.

At step 316, the method 300 disables interrupts by calling the 'cli' instruction. The method 300 proceeds to step 318. At step 318, the method 300 jumps through the call gate. The method 300 makes a far call to the call gate using a segment selector to execute the call gate target code. The method 300 proceeds to step 320.

At step 320, the method 300 enables the sandbox using redirection of the IDT. The method 300 modifies the IDTR to include a base address for a modified IDT resulting in an IDT-based sandbox. The redirection also disables (or redirects) "fast" system calls (e.g., a syscall or a systenter). The method 300 proceeds to step 322. At step 322, the method 300 modifies the return address in the stack frame to return programming control to the address saved in the table by ioctl in step 308 above. The method 300 proceeds to step 324. At step 324, the method 300 modifies the client task flags in the stack frame so I/O privilege level is set to high, meaning it may only be called from a process with a high privilege level. Upon return, the client code will execute without elevated privileges. The IOPL is set to high so privileged instructions such as 'cli' cannot be called.

The method 300 proceeds to step 326. At step 326, the method 300 disables the call gate. The call gate descriptor is disabled or deleted from the LDT. The method 300 proceeds to step 328. At step 328, the method 300 returns programming control to the client thread. Thus, the method 300 prevents kernel panics by disabling interrupts before jumping through the call gate. Further, by disabling the call gate when it is not in use, the method 300 reduces the attack surface of the security sandbox by the client thread. The method 300 proceeds to step 330 and ends.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 4:
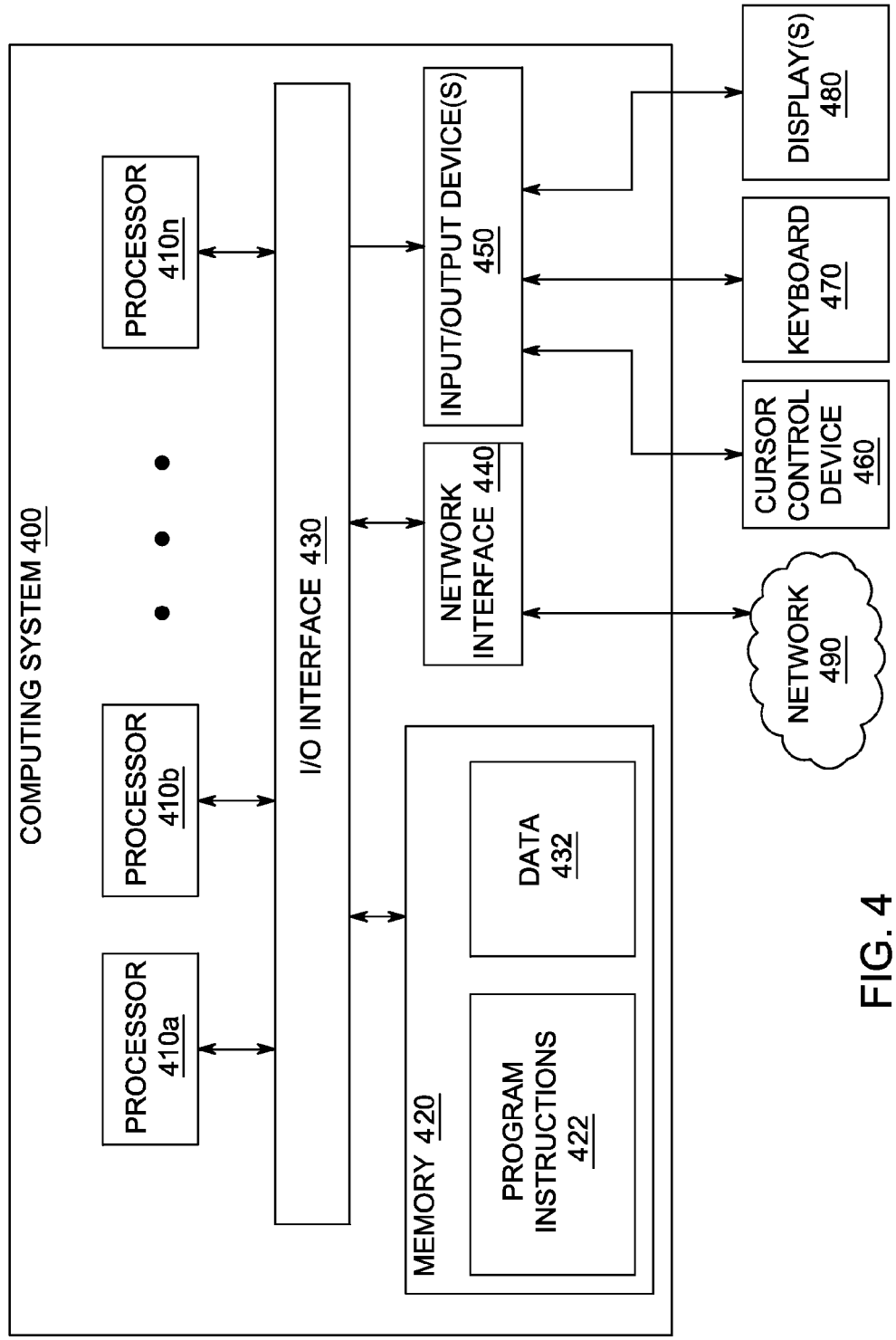
FIG. 4 depicts a computer system that can be utilized in various embodiments of the present invention, according to one or more embodiments of the invention.

FIG. 4 depicts a computer system that can be utilized in various embodiments of the present invention, according to one or more embodiments of the invention.

Various embodiments of method and apparatus for copying of attributes from a source UI element to a target element, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement method 300, as processor-executable executable program instructions 422 (e.g., program instructions executable by processor(s) 410) in various embodiments.

In the illustrated embodiment, computer system 400 includes one or more processors 410 coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of components may be utilized by the system to receive user input described above. In various embodiments, a user interface (e.g., user interface) may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs), such as the x96, PowerPC, SPARC, or MIPS ISAs, or any other suitable ISA. In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one components (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 450 may, in some embodiments, include one or more display terminals, keyboards, keypads, touch pads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the methods described above, such as the methods illustrated by the flowchart of FIGS. 8-10. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for preventing a security sandbox from causing a kernel panic when using a call gate comprising:
   receiving a request from an application to create an interrupt descriptor table (IDT) based secure sandbox, wherein epilog code is mapped into the application upon receiving the request;
   enabling or re-enabling a call gate, wherein the call gate defines a location of call gate target code for enabling the secure sandbox;
   executing the epilog code to facilitate execution of an interrupt disable instruction at an elevated level of input/output (I/O) privileges;
   jumping through the call gate, with interrupts disabled, to prevent triggering of an interrupt after a jump through the call gate but before granting of permission to the application to disable interrupts; and
   enabling the secure sandbox.

2. The method of claim 1, wherein enabling a call gate comprises adding a call gate descriptor for the call gate to a segment descriptor table for the application.

3. The method of claim 2, further comprising:
   modifying one or more entries in a stack after the call gate descriptor is added to the segment descriptor table;
   modifying a plurality of flags for the application in the stack to change I/O privileges from a higher privilege level to a lower privilege level; and returning programming control to the epilog upon granting elevated I/O privileges.

4. The method of claim 1, further comprising:
modifying one or more entries in a stack after the secure sandbox is enabled;
modifying a plurality of flags for the application in the stack to change I/O privileges from a lower privilege level to a higher privilege level;
disabling the call gate; and
returning programming control to the application upon the disabling of the call gate.

5. The method of claim 1, wherein the request is generated using an application programming interface of a device driver.

6. The method of claim 3, wherein modifying comprises:
modifying a return address in the stack to point to the epilog code; and
saving an original return address from the stack into a driver-controlled table.

7. The method of claim 4, wherein modifying one or more entries comprises modifying a return address in the stack to return programming control to an original return address from the stack, wherein the original return address was saved into a driver-controlled table.

8. A non-transitory computer readable medium for storing executable code that, when executed by a processor, causes the processor to perform a method, preventing security sandbox from causing a kernel panic when using a call gate, the method comprising:
receiving a request from an application to create an interrupt descriptor table (IDT) based secure sandbox, wherein epilog code is mapped into the application upon receiving the request, and wherein the request is generated using an application programming interface of a device driver;
enabling or re-enabling a call gate, wherein the call gate defines a location of call gate target code for enabling the secure sandbox;
executing the epilog code to facilitate execution of an interrupt disable instruction at an elevated level of input/output (I/O) privileges;
jumping through the call gate, with interrupts disabled, to prevent triggering of an interrupt after a jump through the call gate but before granting of permission to the application to disable interrupts; and
enabling the secure sandbox.

9. The computer readable medium of claim 8, wherein enabling a call gate comprises adding a call gate descriptor for the call gate to a segment descriptor table for the application.

10. The computer readable medium of claim 9, further comprising:
modifying one or more entries in a stack after the call gate descriptor is added to the segment descriptor table;
modifying a plurality of flags for the application in the stack to change I/O privileges from a higher privilege level to a lower privilege level; and
returning programming control to the epilog upon granting elevated I/O privileges.

11. The computer readable medium of claim 8, further comprising:
modifying one or more entries in a stack after the secure sandbox is enabled;
modifying a plurality of flags for the application in the stack to change I/O privileges from a lower privilege level to a higher privilege level;
disabling the call gate; and
returning programming control to the application upon the disabling of the call gate.

12. The computer readable medium of claim 8, wherein the request is generated using an application programming interface of a device driver.

13. The computer readable medium of claim 10, wherein modifying comprises:
modifying a return address in the stack to point to the epilog code; and
saving an original return address from the stack into a driver-controlled table.

14. The computer readable medium of claim 11, wherein modifying one or more entries comprises modifying a return address in the stack to return programming control to an original return address from the stack, wherein the original return address was saved into a driver-controlled table.

15. An apparatus for preventing security sandbox from causing a kernel panic when using a call gate comprising:
a processor; and
a computer readable storage device having stored therein:
an application;
a device driver; and
an operating system kernel;
wherein the computer readable storage device is coupled to the processor and causes the processor to perform operations comprising:
receiving a request from an application to create an interrupt descriptor table (IDT) based secure sandbox, wherein epilog code is mapped into the application upon receiving the request, and wherein the request is generated using an application programming interface of a device driver;
enabling or re-enabling a call gate, wherein the call gate defines a location of call gate target code for enabling the secure sandbox;
executing the epilog code to facilitate execution of an interrupt disable instruction at an elevated level of input/output (I/O) privileges;
jumping through the call gate, with interrupts disabled, to prevent triggering of an interrupt after a jump through the call gate but before granting of permission to the application to disable interrupts; and
enabling the secure sandbox.

16. The apparatus of claim 15, wherein enabling a call gate comprises adding a call gate descriptor for the call gate to a segment descriptor table for the application.

17. The apparatus of claim 16, further comprising:
modifying one or more entries in a stack after the call gate descriptor is added to the segment descriptor table;
modifying a plurality of flags for the application in the stack to change I/O privileges from a higher privilege level to a lower privilege level; and
returning programming control to the epilog upon granting elevated I/O privileges.

18. The apparatus of claim 15, further comprising:
modifying one or more entries in a stack after the secure sandbox is enabled;
modifying a plurality of flags for the application in the stack to change I/O privileges from a lower privilege level to a higher privilege level;
disabling the call gate; and
returning programming control to the application upon the disabling of the call gate.

19. The apparatus of claim 17, wherein modifying comprises:
modifying a return address in the stack to point to the epilog code; and saving an original return address from the stack into a driver-controlled table.

20. The apparatus of claim 18, wherein modifying one or more entries comprises modifying a return address in the stack to return programming control to an original return address from the stack, wherein the original return address was saved into a driver-controlled table.

\* \* \* \* \*